United States Patent [19]

Cooperman et al.

[11] Patent Number: 5,374,687
[45] Date of Patent: Dec. 20, 1994

[54] ANTI-SETTLING AGENTS FOR AQUEOUS COATING COMPOSITIONS

[75] Inventors: Murray C. Cooperman, Woodbridge; William W. Reichert, Freehold, both of N.J.

[73] Assignee: Rheox, Inc., Hightstown, N.J.

[21] Appl. No.: 174,617

[22] Filed: Dec. 28, 1993

Related U.S. Application Data

[63] Continuation of Ser. No. 786,463, Nov. 4, 1991, abandoned.

[51] Int. Cl.$^5$ .............. C08F 8/44; C08F 20/06; C08F 20/64
[52] U.S. Cl. .............. 525/330.2; 106/14.35; 106/14.44; 252/351; 252/352; 525/329.5; 525/330.3; 525/366; 525/369; 525/378; 525/379; 525/919; 526/348.8; 526/910; 526/911; 526/932
[58] Field of Search ............ 526/932, 910, 911; 525/330.2, 330.3, 919

[56] References Cited

U.S. PATENT DOCUMENTS

| | | | |
|---|---|---|---|
| 3,472,825 | 10/1969 | Walter | 525/330.2 |
| 3,658,741 | 4/1972 | Knutson et al. | |
| 3,909,280 | 9/1975 | Dench et al. | |
| 4,173,669 | 11/1979 | Ashida | 525/330.2 |
| 4,381,376 | 4/1983 | Albee, Jr. et al. | |
| 4,439,575 | 3/1984 | Schwarz | |
| 4,603,172 | 7/1986 | Albee | 525/143 |
| 4,975,119 | 12/1990 | Cooperman | 106/271 |
| 5,028,265 | 7/1991 | Schmidt-Thuemmes et al. | 106/271 |

FOREIGN PATENT DOCUMENTS 1268418  3/1972  United Kingdom .

*Primary Examiner*—Fred Zitomer
*Attorney, Agent, or Firm*—Michael J. Cronin

[57] ABSTRACT

A pourable, liquid antisettling composition comprises at least one low molecular weight copolymer of ethylene and an alpha, beta-ethylenically unsaturated carboxylic acid that has been neutralized with a neutralizing agent and water. The composition can be an additive in aqueous coating compositions and provides excellent pigment suspension and rheological properties to aqueous based coating and ink compositions.

13 Claims, No Drawings

ANTI-SETTLING AGENTS FOR AQUEOUS COATING COMPOSITIONS

This application is a continuation of copending application. Ser. No. 07/786,463, filed Nov. 4, 1991, now abandoned.

BACKGROUND AND SUMMARY OF THE INVENTION

The present invention relates to antisettling compositions in liquid pourable form that provide excellent pigment suspension and rheological properties to aqueous coating compositions.

It is known in the art to add pigment suspension or antisettling agents to coating compositions to prevent pigments or other finely divided solid particles from settling during storage. Depending on the hardness of the settling, it is difficult, and sometimes not possible, to evenly redisperse by stirring the solid material throughout the coating system. The art has constantly sought materials that are useful to control the rheological properties and pigment suspension properties of aqueous fluid systems containing finely divided solid particles and, additionally, are easy to use.

One type of material which has been shown to be useful as antisettling or pigment suspension agents for organic (or non-aqueous) coating compositions are emulsifiable polyethylene waxes dispersed in organic solvents as disclosed in U.S. Pat. Nos. 3,123,488 and 3,184,233. Additionally, U.S. Pat. No. 3,985,568 discloses a creamy paste comprising finely divided particles of an emulsifiable polyethylene wax suspended in a sulfated/sulfonated castor oil solution which is useful for modifying the rheological and suspension properties of non-aqueous fluid systems containing finely divided solid particles. Moreover, U.S. Pat. No. 4,975,119 discloses a liquid antisettling composition for organic coating compositions which comprises at least one emulsifiable polyethylene wax, at least one salt of an alkyl hydrogen sulfate, at least one salt of a reaction product of a polyvalent inorganic acid and a fatty ester compound or fatty acid derivative, an organic solvent and, optionally, water.

U.S. Pat. No. 3,937,678 discloses a process for improving the rheological properties and suspension properties of non-aqueous fluid systems containing finely divided solid particles by adding to the non-aqueous fluid system a mixture of an amide wax having a melting point of from about 100° C. to about 160° C. obtained by reacting hydrogenated castor oil fatty acid or an organic mixture containing at least 30 molar percent of hydrogenated castor oil fatty acid with amines, and an emulsifiable polyethylene wax having an acid number of from about 2 to about 50, a softening point of from about 95° C. to about 120° C., a density of from about 0.92 to about 0.98, and a penetration hardness of from about 1 to about 20.

Emulsifiable polyethylene waxes find, however, limited use as pigment suspension or antisettling agents in aqueous or water-borne coatings systems. Japan Kokai 76 04 087 discloses the use of emulsifiable polyethylene waxes to stabilize a dispersion of pigments in water thinned coating compositions where the emulsifiable wax is dispersed in xylene solvent which results in a paste and the thinner is a butyl cellosolve/isopropyl alcohol/water solvent system.

Typically, thickeners such as fumed silica or clays such as montmorillonite, hectorite, or attapulgite have been used in aqueous coating systems to correct pigment settling problems. However, these materials have the disadvantage of lowering the gloss associated with the cured coating system and are difficult to use as a post-add correction at the completion of the preparation of a paint. These materials are difficult to disperse during the manufacture of paints and require high shear mixing equipment to achieve adequate dispersion.

Other thickeners which act as stabilizing agents to deter sedimentation include the natural gums, for example, xanthan gum, alginate, gum arabic, guar gum, tragacanth gum, and locust bean gum; cellulose derivatives such as carboxymethyl cellulose and hydroxyethyl cellulose, and modified starches.

Furthermore, the use of polyacrylic/acrylate thickeners such as CPE-15, WS-24, and Rheoplex B-505 commercially available from the Rohm and Haas Company have been reported in U.S. Pat. No. 4,432,797 as providing resistance to pigment settling in a waterborne wood stain. Additionally, pigment wetting agents or surfactants based on ethoxylated nonylphenols have been added to water reducible coatings for pigment suspension.

U.S. Pat. No. 4,071,487 discloses antisettling agents for use in pigmented aqueous lacquer systems wherein the agents are water dispersible (including water-soluble) amine salts of the products formed by reacting at 200° C. to 250° C., a $C_{14-20}$ unsaturated fatty alcohol with an ethylene dicarboxylic acid to form a substantially neutral ester which is further reacted with about 1/7 to 1/35 of its weight with an ethylene dicarboxylic acid or anhydride compound. The amine neutralization is performed in organic solvents miscible with water which are stable on storage and may be incorporated into the lacquer at any point in its manufacture.

U.S. Pat. No. 4,439,575 discloses aqueous varnishes which contain mineral fillers and/or pigments and show virtually no sedimentation of the solid constituents. These varnishes are prepared by allowing a hot wax emulsion in water at between 80° C. and 100° C. to flow with vigorous stirring into the aqueous varnish containing the mineral fillers and/or pigments. Suitable waxes have a melting point above 60° C. and a cloud point in toluene between 35° C. and 45° C. Particularly suitable waxes are montan waxes, which have been bleached and modified, or ester waxes based on modified montan waxes. The waxes can also be coupled with a nonionic emulsifier system.

In a field unrelated to antisettling additives, Japanese Tokyo Koho 81/09,522 discloses ethylene-maleic anhydride copolymers that are treated in the molten state with compounds having $\geq 20$ H and/or primary or secondary amino groups to provide a modified ethylene-maleic anhydride copolymer with increased melt index, Young's modulus, and elongation.

Furthermore, U.S. Pat. No. 4,381,376 discloses a method for forming ionic copolymer salts from low molecular weight copolymer acids formed from ethylene and an alpha, beta-ethylenically unsaturated carboxylic acid having at least one carboxylic acid group, and cations having a valence of 1 to 3. In U.S. Pat. No. 4,603,172, the ionic copolymer salts of a low molecular weight copolymer acid of an alpha-olefin and alpha, beta-ethylenically unsaturated carboxylic acid are disclosed to be dispersion aids to disperse finely divided inert material such as pigments in a variety of nonacqueous polymer compositions including polypropylene and polyethylene. Allied-Signal, which owns said U.S. Pat. No. 4,381,376, sells AClyn ionomers which are low molecular weight ethylene-based copolymers neutralized with metal salts, including sodium, zinc, calcium and magnesium salts.

Other patents of interest include BASF U.S. Pat. Nos. 4,406,705 and 4,417,035 which relate to water emulsifiable hand waxes consisting of ethylene-carboxylic copolymers.

Accordingly, an ongoing search has been made for new additives for modifying the rheological and suspension properties of aqueous and water-borne fluid systems containing finely divided solid particles that are efficient, easily handled and readily dispersible in the aqueous fluid system requiring suspension properties.

The present invention overcomes the problems and disadvantages of the prior art by providing a homogeneous pourable liquid additive in water which provides excellent pigment suspension and rheological properties to aqueous coating compositions.

It is an object of the invention to provide a liquid, pourable composition that provides suspension properties to aqueous compositions containing finely divided solid particles, that is easy to handle, and is readily incorporated into aqueous compositions.

It is a further object of the invention to provide a liquid, pourable composition that provides suspension properties to aqueous compositions that are stable on storage and do not exhibit excessive syneresis.

An additional object of the invention is to provide a process for improving the rheological and suspension properties of aqueous compositions containing finely divided solid particles.

It is yet another object of the invention to provide stable suspensions of finely divided solid particles in aqueous compositions so that these particles do not exhibit excessive syneresis or hard settling during prolonged storage periods.

Additional objects and advantages of the invention will be set forth in part in the description which follows, and in part will be obvious from the description, or may be learned by practice of the invention. The objects and advantages of the invention will be realized and attained by means of the instrumentality and combinations, particularly pointed out in the appended claims.

To achieve the objects and in accordance with the purpose of the invention, as embodied and broadly described herein, the invention provides a liquid antisettling composition comprising (a) at least one low molecular weight copolymer of an alpha-olefin and an alpha, beta-ethylenically unsaturated carboxylic acid, (b) a neutralizing agent, and (c) water.

The liquid antisettling composition of the invention imparts suspension properties to aqueous compositions that contain finely divided solid particles and provides effective rheological properties to aqueous coating compositions. The liquid anti-settling composition of the present invention is highly efficient in suspension properties and can be used at lower loadings than commercially available products. The composition provides easier dispersion in aqueous paint systems than prior art pigment suspension or antisettling agents. Further, the composition of the invention can be incorporated in the coating composition at any stage of its manufacture which results in shorter processing time. Since the composition is in liquid form that is pourable and pumpable, it can be easily handled in a coatings manufacturing plant and thus reduces handling time and handling losses.

The invention also provides a process for improving the rheological and suspension properties of aqueous compositions containing finely divided solid particles comprising adding the liquid antisettling composition of the invention to an aqueous composition.

The invention further provides for aqueous compositions that contain the liquid antisettling composition that are stable suspensions of finely divided solid particles in aqueous compositions that do not exhibit excessive syneresis or hard settling during prolonged storage periods.

DETAILED DESCRIPTION OF PREFERRED EMBODIMENTS

The liquid antisettling composition of the present invention is useful in aqueous compositions, particularly aqueous coating compositions such as water-reducible paints.

Preferably at least one low molecular weight copolymer of an alpha-olefin and alpha, beta-ethylenically unsaturated carboxylic acid herein referred to as copolymer acid is present in the antisettling composition of the present invention in an amount of from about 3 to about 70 weight percent, more preferably in an amount of from about 10 to 35 weight percent, and most preferably in an amount from about 20 to about 30 weight percent.

The alpha, beta-ethylenically unsaturated carboxylic acid can be a mono-carboxylic acid, or have more than one carboxylic acid group attached to it. The alpha, beta-ethylenically unsaturated carboxylic acids which can be copolymerized with the alpha-olefin preferably have 3 to 8 carbon atoms. Examples of such acids include acrylic acid, methacrylic acid, ethacrylic acid, crotonic acid, maleic acid, and fumaric acid and anhydrides of dicarboxylic acids such as maleic anhydride.

The molecular weight of the low molecular weight copolymer acid is from about 500 to about 20,000, preferably from about 1,000 to 15,000, more preferably from about 1,000 to about 6,000 and most preferably from about 1,000 to about 3,500.

The alpha-olefin is preferably ethylene. The concentration of the ethylene in the copolymer is at least 50 mol percent and preferably above 80 mol percent.

A preferred copolymer acid is a copolymer of ethylene and an alpha, beta-ethylenically unsaturated monocarboxylic acid having 3 to 6 carbon atoms. A most preferred alpha, beta-ethylenically unsaturated monocarboxylic acid is acrylic acid.

The copolymer acid has an acid value in the range from about 20 to about 300, with an acid number from about 40 to 200 being preferred, and an acid number from about 40 to 120 being most preferred. The acid number is determined by the number of milligrams of potassium hydroxide necessary to neutralize one gram of copolymer acid.

Preferably, the copolymer acid has a density of from about 0.92 to about 0.98 g/cc, a penetration hardness of from about 1 to about 60 dmm (ASTM D-5 and ASTM D-1321) and a softening point of from about 70° C. to about 120° C. (ASTM D-3954).

Additionally, monomers which contain a polymerizable ethylenically unsaturated group may also be employed in the copolymers of the present invention, provided that the monomers do not adversely affect the antisettling properties of the copolymer acids. Exemplary suitable copolymerizable monomers, which contains at least one terminal $CH_2=C<$ group, are vinyl acetate, vinyl pyrrolidinone, methyl vinyl ether, and ethyl vinyl ether.

The low molecular weight copolymer acids used to make the liquid antisettling composition of the present invention can be prepared by any suitable process known in the art. An exemplary preparation method and exemplary suitable waxes are described in U.S. Pat. Nos. 3,658,741 and 3,909,280 which are incorporated herein by reference.

Exemplary suitable ethylene-acrylic acid copolymers for use in the present invention may include carboxyl-containing ethylene copolymers such as ethylene-acrylic acid-vinyl acetate terpolymers. Suitable carboxyl-containing ethylene copolymers are commercially available under the A-C tradename from Allied-Signal, Inc.

The neutralizing agent employed in the present invention can be a group 1A metal compound such as lithium, sodium, potassium, cesium and the like as the hydroxide, oxide, or carbonate and the like, as well as ammonia and organic amines including mono-, di-, and triethanolamine, diethylaminoethanol, 2-(2-aminoethylamino)ethanol, 2-amino-2-methyl-1-propanol and trimethylamine. Preferably, the neutralizing agent is selected from ammonia or amines such as mono-, di- and triethanolamine, monoethylamine, monopropyl amine, diethylaminoethanol, ethylene diamine, and 2-amino-2-methyl-1-propanol commercially available as AMP-95 from Angus Chemical, and the like. Most preferably the neutralizing agent is triethanol amine and diethylaminoethanol.

Preferably, the amount of neutralizing agent is present in the liquid antisettling composition in an amount from 25% to 200% of the amount required to neutralize the acid groups of the copolymer acid, more preferably from about 75% to about 125% of the amount required to neutralize the acid groups of the copolymer acid, and most preferably in an amount to completely neutralize the acid groups of the copolymer acid.

The neutralization of the preferred ethylene-acrylic acid copolymers is well known in the art. For example, BASF and Allied-Signal Inc. recommend in their literature the neutralization of these types of copolymers with an amine or ammonia to make the copolymers emulsifiable in water for use as slip and mar resistance agents and to provide adhesion and better seal properties. The present invention is based on the surprising discovery that neutralized ethylene-acrylic acid copolymers impart antisettling behavior to water-based coatings and inks.

The copolymer acid is neutralized in water. The water is preferably present in an amount of from about 30 wt. % to about 95 wt. %, more preferably from about 65 wt. % to about 90 wt. %, and most preferably from about 70 wt. % to about 80 wt. % of the liquid antisettling composition. Solvents that are also miscible with water and are compatible with specific aqueous compositions can also replace some or all of the water as the solvent. Exemplary solvents may include lower alcohols such as methanol ethanol, isopropanol, propanol, isopropanol butanol, sec-butanol, cyclohexanol, glycol ether or glycol ether acetates as long as these solvents are not detrimental to the performance of the aqueous coating system.

The finely divided solid particles to be suspended by the compositions of this invention should be of a colloidal nature or a size that can be dispersed in the aqueous medium. The particles should be substantially insoluble in the medium in which they are suspended. There is no particular upper limit on particle size, but the size should be such that the particles are capable of being initially suspended in the selected medium. The solid particles may be pigments, inert fillers, fillers, reflecting agents, and the like.

The antisettling compositions of the present invention can be prepared by known techniques wherein the copolymer acids are neutralized in water or neutralized neat in the melt phase and then added to water or vice versa. For example, the ingredients (the copolymer acid, a neutralizing agent, and water) may be charged to a suitable reaction vessel which is capable of withstanding autogenous pressure and equipped with a mechanical stirrer and a thermometer. The materials can be added at any time and at any temperature and simultaneously or in any order during the heating with the requirement that the copolymer acid is neutralized and dispersed in water and a uniform liquid mass is obtained. The mixture is usually heated under an inert atmosphere to a temperature of 85°–140° C., preferably 100°–135° C. The use of an inert atmosphere is optional in that the presence of an inert gas such as nitrogen inhibits a dark coloring of the product but in no way affects product performance. The resulting liquid product can be cooled with or without agitation, but slow agitation is preferred. In either case, a homogeneous fluid product is obtained.

The homogeneous liquid antisettling compositions of the present invention can be employed in various aqueous compositions to prevent settling of finely divided solid particles. The liquid antisettling compositions of the present invention may be used as a rheology modifier and suspension agent of finely divided solid particles in a variety of water-based compositions. The compositions of the invention are useful, for example, in imparting antisettling properties to latex (including vinyl acrylic and acrylic latex coatings) and water-reducible products, including water-reducible alkyd paint formulations, water-based ink formulations, water-based traffic paints, water-based dip coat formulations, and water-based foundry compounds.

The amount of antisettling composition used in a specific application is determined by numerous factors including the type of copolymer acid, the type of water-based compositions that require an antisettling additive, and the level of performance (pigment suspension control and rheology control) desired. However, a general range is from about 1.0 to about 30 pounds per hundred gallons (phg) of aqueous composition.

The effectiveness of the antisettling compositions of the present invention was determined by use in various aqueous coating compositions and other formulations.

The invention will be further clarified by the following examples, which are intended to be purely exemplary of the invention.

EXAMPLE 1

240.0 g of an ethylene-acrylic acid copolymer (A-C 5120, commercially available from Allied-Signal, Inc.), 72.0 g 98% triethanolamine, and 960.0 g water were added to a 2 L Parr pressure reactor equipped with a mechanical stirrer and a cooling coil. The mixture was heated to about 135° with stirring and was heated at about 135° for 30 minutes followed by cooling to 60° C. with air cooling via the internal cooling coils. Upon reaching 60° C., the mixture was further cooled to room temperature with water cooling via the internal cooling coils. The material, after cooling, was a white, opaque, homogeneous liquid product.

2.0 to 3.0 g of the sample were taken and dried in a forced oven for 18 hours at 105° C. The percent solids of the liquid product was determined to be 24.5%.

EXAMPLE 2

240.0 g of an ethylene-acrylic acid copolymer (A-C 5120, commercially available from Allied-Signal, Inc.), 30.0 g diethanol amine, and 960.0 g water were added to a 2 L Parr pressure reactor equipped with a mechanical stirrer and a cooling coil. With stirring, the mixture was heated to 135° C. and was heated at 135° C. for 30 minutes followed by cooling to 60° C. with air cooling via the internal cooling coils. Upon reaching 60° C., the mixture is further cooled to room temperature with water cooling via the internal cooling coils. The material, after cooling, was a white, opaque, homogenous liquid product.

2.0 to 3.0 g of the sample were taken and dried in a forced air oven for 16 hours at 105° C. The percent solids of the liquid product was determined to be 23.5%.

EXAMPLE 3

240.0 g of an ethylene-acrylic acid copolymer (A-C 5120, commercially available from Allied-Signal, Inc.), 19.3 g NaOH, and 960.0 g water were added to a 2 L Parr pressure reactor equipped with a mechanical stirrer and a heating coil. With stirring, the mixture was heated to 135° C. and was heated at 135° C. for 30 minutes followed by cooling to 60° C. with air cooling via the internal cooling coils. Upon reaching 60° C., the mixture was further cooled to room temperature with water cooling via the internal cooling coils. The material, after cooling, was a white, opaque, homogeneous liquid product.

2.0 to 3.0 g of the sample were taken and dried in a forced air oven for 16 hours at 105° C. The percent solids of the liquid product was determined to be 22.8%.

EXAMPLE 4

59.1 g of an ethylene-acrylic acid copolymer (A-C 5120, commercially available from Allied-Signal, Inc.), 17.7 g 98% triethanolamine, were added to a 500 mL resin flask equipped with a water condenser, thermometer, nitrogen gas inlet, high speed agitator and a heating mantle. The reaction flask was blanketed with a nitrogen gas atmosphere during the reaction. The reaction mixture was heated to 108° C. and was in a molten form. 234.6 g water was heated to 95° C. separately in a 600 mL beaker and then added to the hot reaction mixture in the resin flask with agitation. The reaction mixture was then cooled to room temperature. The material, after cooling, was a white, opaque homogeneous liquid product.

2.0 to 3.0 g of the sample were taken and dried in a forced air oven for 16 hours at 105° C. The percent solids of the liquid product was determined to be 24.0% solids.

EXAMPLE 5

160.0 g of an ethylene-acrylic acid copolymer (A-C 5120, commercially available from Allied-Signal, Inc.), 48.0 g 98% triethanolamine, 32.0 g sulfated castor oil (Eureka 102 commercially available from Atlas Refinery, Inc. containing 70% sulfated castor oil and 30% water), and 128.0 g water were added to a 1 L resin flask equipped with a water condenser, thermometer, nitrogen gas inlet, high speed agitator and a heating mantle. The reaction flask was blanketed with a nitrogen gas atmosphere during the reaction. The reaction mixture was then heated to 95° C. 512.0 g water was then added to the heated reaction mixture and the temperature of the reaction mixture dropped to 58° C. The reaction mixture was heated to 100° C. and then cooled to 34° C. The material, after cooling, was a creamcolored, opaque, homogeneous liquid product.

2.0 to 3.0 g of the sample were taken and dried in a forced air oven for 16 hours at 105° C. The percent solids of the liquid product was determined to be 24.5% solids.

EXAMPLE 6

59.1 g of an ethylene-acrylic acid copolymer (A-C 5120, commercially available from Allied-Signal, Inc.), 17.7 g 98% solution of triethanolamine, 11.8 g triethanolamine lauryl sulfate and 236.4 g water were added to a 500 mL resin flask equipped with a water condenser, thermometer, nitrogen gas inlet, mechanical agitator, and a heating mantle. The reaction flask was blanketed with a nitrogen gas atmosphere during the reaction. The reaction mixture was heated to 100° C. and then cooled to 35° C. The material, after cooling, was a white, homogeneous liquid product.

2.0 to 3.0 g of the sample were taken and dried in a forced air oven for 16 hours at 105° C. The percent solids of the liquid product was determined to be 24.6% solids.

EXAMPLE 7

80.0 g of an ethylene-acrylic acid copolymer (A-C 5120, commercially available from Allied-Signal, Inc.), 24.0 g 98% triethanolamine, and 16.0 g sulfated castor oil (Eureka 102 commercially available from Atlas Refinery, Inc. containing 70% sulfated castor oil and 30% water), and 320.0 g n-butanol were added to a 1 L resin flask equipped with a water condenser, thermometer, nitrogen gas inlet, mechanical stirrer, and a heating mantle. The reaction flask was blanketed with a nitrogen gas atmosphere during the reaction. The reaction mixture was then heated to 92° C. to form a slightly hazy liquid.

The reaction mixture was stirred with cooling to room temperature. The material, after cooling, was a creamy, opaque, homogenous liquid product.

1.0 to 2.0 g of the sample were taken and dried in a forced air oven for 16 hours at 105° C. The percent solids of the liquid product was determined to be 23.0%.

Evaluation of Antisettling Compositions of Examples 1-7

The effectiveness of the antisettling compositions of Examples 1-7 was determined in various paint and other formulations. The data set forth below demonstrate the suitability of the anti-settling compositions for use in aqueous coating compositions.

A water-reducible alkyd paint was prepared by mixing the ingredients set forth in Formulation A in the order listed.

After the paints were prepared, the paint properties such as fineness of grind (FOG), Brookfield viscosity, Stormer viscosity, sag resistance, and pigment settling were measured at selected time intervals.

The fineness of grind was measured in Hegman units using a Hegman gauge in accordance with ASTM D1210-79.

Brookfield viscosities at 10 and 100 rpm were measured with a Brookfield Viscometer Model RVT in accordance with ASTM D1296-81. From viscosity data, a Thixotropic Index (T.I.) was obtained as follows:

$$\text{Thixotropic Index } (T.I.) = \frac{\text{Viscosity at 10 rpm}}{\text{Viscosity at 100 rpm}}$$

Stormer viscosities were measured in Krebs Units (KU) with a Thomas Stormer Instrument, Model #09730-G15, in accordance with ASTM D562-81.

Sag resistance was measured in mils using a Leneta sag multinotch applicator at room temperature in accordance with ASTM D4400-84.

The degree of pigment settling of a paint was evaluated in accordance with ASTM D869-78. On a scale of 0–10, a rating of 0 indicates the presence of a very firm cake that cannot be reincorporated with the liquid to form a smooth paint by stirring manually, and a rating of 10 represents a perfect suspension with no change from the original condition of the paint.

| Formulation A: Water-Reducible Alkyd Primer | | | |
|---|---|---|---|
| Ingredient | Generic Name | Manufacturer | Pounds* |
| Deionized Water | Water | — | 179.7 |
| 28% Ammonium Hydroxide | Ammonium Hydroxide | Aldrich Chemical Co. | 8.3 |
| Butyl Cellosolve | Ethylene glycol monobutyl ether | Union Carbide | 43.0 |
| BYK-301 | Polysiloxene flow additive | ByK Chemie | 0.9 |
| Kelsol 3902 BG4-75 | Water reducible alkyd binder | Reichhold Chemical Co. | 144.7 |
| Antisettling Additive | See examples | | |
| Mix 5 minutes at 3,000 RPM. | | | |
| Barytes No. 1 | Barium sulfate | Whittaker, Clark & Daniels | 86.1 |
| Imsil A10 | Crystalline silica | Illinois Minerals Co. | 18.9 |
| Atomite | Calcium carbonate | ECC America, Inc. | 86.1 |
| MAPICO 297RFO | Red iron oxide | Columbia Carbon | 86.1 |
| Zinc Phosphate, ZP-10 | Zinc Phosphate | Heyco Tech | 68.9 |
| Add Dragonite media, 2 mm. | | | |
| Grind 15 minutes at 8,000 RPM. Use a Dispermat CV fitted with a 60 mm disk impeller. | | | |
| Letdown: | | | |
| Butyl Cellosolve | Ethylene glycol monobutyl ether | Union Carbide | 11.2 |
| 6% Cobalt Intercat | Drier | Arzo Chemie | 1.7 |
| 6% Zirco Intercat | Drier | Arzo Chemie | 0.9 |
| Activ-8 | Drier accelerator | R. T. Vanderbilt | 0.9 |
| Eskin #2 | Antiskinning agent | Hüulls | 0.6 |
| Deionized Water | Water | — | 241.1 |
| 28% Ammonium Hydroxide | Ammonium Hydroxide | Aldrich Chemical | 6.9 |
| Kelsol 3902 BG4-75 | Water reducible alkyd binder | Reichhold Chemical | 86.1 |

| Formulation A: Water-Reducible Alkyd Primer | | | |
|---|---|---|---|
| Ingredient | Generic Name | Manufacturer | Pounds* |
| Total (without antisettling composition) | | | 1072.1 |

*Basic Formulation; test composition may be prepared with different amounts, but proportional to those set forth.

The stability of the paint was tested by storing each sample of paint for a selective period at room temperature (e.g., 70° F.). At the end of an aging period, each sample was examined for appearance, fineness of grind, Brookfield viscosity, Stormer viscosity, sag resistance, pigment settling and other properties, if desired.

EXAMPLE 8

The material prepared according to Example 1 was incorporated into a water-reducible air-dry alkyd primer described in Formulation A. The antisettling composition of Example 1 was added to the millbase at a 5.0 pounds per hundred gallons loading on a solids basis. The paint properties were evaluated and are set forth in Table 1.

Comparative Example A

A water-reducible air-dry alkyd primer was prepared according to the procedures described in Formulation A, and M-P-A 1075 (commercially available from RHEOX, Inc.) was added to the millbase. M-P-A 1075 is a trademark representing an emulsifiable polyethylene wax antisettling composition dispersed in n-butanol in paste form. The antisettling additive loading was equivalent to 5.0 pounds per hundred gallons on a solids basis. The paint properties were evaluated and are set forth in Table 1.

EXAMPLES 9–11

The material prepared according to Examples 4, 5, and 6 was incorporated into a water-reducible air-dry alkyd primer described in Formulation A. The antisettling additive was added to the millbase at a 5.0 pounds per hundred gallons loading on a solids basis. The paint properties were evaluated and are set forth in Table 2.

Comparative Example B

A second water-reducible alkyd primer was prepared according to the procedures described in formulation A, and M-P-A 1075 was added to the millbase. The antisettling additive loading was equivalent to 5.0 pounds per hundred gallons on a solids basis. The paint properties were evaluated and are set forth in Table 2.

Comparative Example C

A water-reducible alkyd primer was prepared according to the procedures described in Formulation A without the addition of an antisettling additive. The paint properties were evaluated and are set forth in Table 2.

EXAMPLE 12

The material prepared according to Example 5 was incorporated into a water-reducible air-dry alkyd primer described in Formulation A. The antisettling composition of Example 5 was added to the millbase at a 9.0 pounds per hundred gallons loading on a solids basis. The paint properties were evaluated and are set forth in Table 3.

EXAMPLE 13

The material prepared according to Example 7 was incorporated into a water-reducible air-dry alkyd primer described in Formulation A. The antisettling composition of Example 7 was added to the millbase at a 9.0 pounds per hundred gallons loading on a solids basis. The paint properties were evaluated and are set forth in Table 3.

Comparative Example D

A water-reducible alkyd primer was prepared according to the procedures described in Formulation A, and M-P-A 1075 was added to the millbase. The antisettling additive loading was equivalent to 9.0 pounds per hundred gallons on a solids basis. The paint properties were evaluated and are set forth in Table 3.

Comparative Example E

A second water-reducible alkyd primer was prepared according to the procedures described in Formulation A without the addition of an antisettling additive. The paint properties were evaluated and are set forth in Table 3.

EXAMPLES 14-16

A second type of water-reducible alkyd primer described in Formulation B was used to test the antisettling performance of the compositions prepared in accordance with Examples 1-3. The antisettling compositions were added to the millbase of a water-reducible alkyd primer paint according to the procedures described in Formulation B at a loading of 10.0 pounds per hundred gallons on a solids basis. The paint properties were evaluated and are set forth in Table 4.

Comparative Example F

A water-reducible alkyd primer was prepared according to the procedures described in Formulation B, and M-P-A 1075 was added to the millbase. The antisettling additive loading was equivalent to 10.0 pounds per hundred gallons on a solids basis. The paint properties were evaluated and are set forth in Table 4.

Comparative Example G

A water-reducible alkyd primer was prepared according to the procedures described in Formulation B without the addition of an antisettling additive. The paint properties were evaluated and are set forth in Table 4.

Formulation B: Water-Reducible Alkyd Primer

| Ingredient | Generic Name | Manufacturer | Pounds* |
|---|---|---|---|
| Deionized Water | Water | — | 139.9 |
| Butyl Cellosolve | Ethelene glycol mono-butyl ether | Union Carbide | 18.0 |
| Secondary Butanol | Sec-butanol | Ashland Chemical Co. | 20.1 |
| 28% Ammonium Hydroxide | Ammonium hydroxide | Aldrich Chemical Co. | 3.6 |
| Kelsol 3962-B2G-70 | Water reducible alkyd binder | Reichhold Chemical Co. | 130.2 |
| Antisettling Additive | (see examples) | | |
| Mix 5 minutes at 2,000 RPM. Use a Dispermat CV fitted with a 50 mm heavy duty impeller blade. | | | |
| 70 Barytes | Barium sulfate | Whittaker, Clark & Daniels | 292.5 |
| B2093F | Red iron oxide | Hareros Pigments, Inc. | 31.8 |
| OK412 | Amorphous silica | DeGussa | 10.0 |
| Zinc Phosphate, ZP-10 | Zinc phosphate | Heyco Tech | 21.5 |
| Grind 15 minutes at 5,400 RPM, then letdown: | | | |
| Deionized Water | Water | — | 271.1 |
| Butyl Cellosolve | Ethylene glycol mono-butyl ether | Union Carbide | 8.3 |
| Secondary Butanol | Sec-butanol | Ashland Chemical Co. | 9.5 |
| 28% Ammonium Hydroxide | Ammonium hydroxide | Aldrich Chemical Co. | 5.3 |
| Kelsol 3962-B2G-70 | Water reducible alkyd binder | Reichhold Chemical Co. | 74.7 |
| Cobalt Hydrocure II | Drier | Mooney Chemical Co. | 1.5 |
| Manganese Hydrocure II | Drier | Mooney Chemical Co. | 3.4 |
| Deionized Water for Water Viscosity Adjustment | Water | — | 29.4 |
| Total (without antisettling composition) | | | 1070.8 |

Notes:
The deionized water, butyl cellosolve, secondary butanol, 28% ammonium hydroxide, and Kelsol 3962-B2G-70 are premixed. The deionized water added as a viscosity adjustment is employed to attain a Ford Cup No. 4 viscosity of 40 seconds.
*Basic Formulation; test composition may be prepared with different amounts, but proportional to those set forth.

EXAMPLES 17-18

The antisettling compositions of Examples 5 and 7 were added to the millbase of a water-reducible alkyd primer paint according to the procedures described in Formulation B at a loading of 9.4 pounds per hundred gallons on a solids basis. The paint properties were evaluated and are set forth in Table 5. Samples of the paints were also heat aged at 120° F. for one month and evaluated for antisettling properties. The pigment settling properties at 120° F. are set forth in Table 6.

Comparative Example H

A water-reducible alkyd primer was prepared according to the procedures described in Formulation B, and M-P-A 1075 was added to the millbase. The antisettling additive loading was equivalent to 9.4 pounds per hundred gallons on a solids basis. The paint properties were evaluated and are set forth in Table 5. A sample of the paint was also heat aged at 120° F. for one month and evaluated for antisettling properties. The pigment settling properties at 120° F. are set forth in Table 6.

Comparative Example I

A second water-reducible alkyd primer was prepared according to the procedures described in Formulation B without the addition of an antisettling additive. The paint properties were evaluated and are set forth in Table 5. A sample of the paint was also heat aged at 120° F. for one month and evaluated for antisettling properties. The pigment settling properties at 120° F. are set forth in Table 6.

EXAMPLE 19

A water-based news red ink described in Formulation C was used to test the antisettling performance of the antisettling composition prepared in accordance with Example 1. A water-based ink was prepared by mixing the ingredients set forth in Formulation C in the order listed. The antisettling composition was added to the base ink at a loading of 3.0%. The antisettling properties of the ink were evaluated according to ASTM D869-78 and are set forth in Table 7.

Comparative Example J

A water-based news red ink was prepared according to the procedures described in Formulation C without the addition of an antisettling additive. The antisettling properties of the ink were evaluated according to ASTM D869-78 and are set forth in Table 7.

| Formulation C: Water-Based News Red Ink | | | |
|---|---|---|---|
| Ingredient | Generic Name | Manufacturer | Parts by Weight |
| Lucidene 141 (30% NV) | Acyrlic emulsion | Morton | 34.0 |
| Barium Lithol Presscake (50% Pigment) | Presscake | Sun Chemical | 38.1 |
| Surfynol 104E | Surfactant | Air Products | 0.3 |
| Isopropyl Alcohol | Isopropyl alcohol | Aldrich Chemical Co. | 2.5 |
| BYK 020 | Defoamer | BYK Chemie | 0.4 |
| Deionized Water | Solvent | — | 24.7 |
| Base Ink | | Total | 100.0 |
| Base Ink | | | 97.0 |
| Antisettling Additive | Ex. 1 | — | 3.0 |
| | | Total | 100.0 |

Three (3) parts of Example 1 by weight was added to 97 parts of the base ink. The ink and antisettling additive were high speed dispersed for 20 minutes and the temperature increased to 108° F. After 20 minutes, the ink was transferred to a Jiffy mill containing approximately 200 grams of steel shot. The ink is shaken on a Red Devil Paint Shaker for 15 minutes. Then 20 parts water was added to the ink to adjust the Shell 2 viscosity to 16 seconds.

TABLE 1

| Example No. | Antisettling Composition (Paint Age) | Loading* (phg) | FOG | Brookfield visc. (CP) 10 rpm/100 rpm | T.I. | Stormer Visc. (KU) | Sag (Mils) | Pigment Settling |
|---|---|---|---|---|---|---|---|---|
| 8 | Ex. 1 | 5.0 | | | | | | |
| | 1 Day, R.T. | | 5B | 1050/1040 | 1.01 | 85 | 5 | 7 |
| | 3 Wks, R.T. | | | | | | | 7 |
| | 2 Mos, R.T. | | | | | | | 6 |
| Comp. Ex. A | M-P-A 1075 | 5.0 | | | | | | |
| | 1 Day, R.T. | | 5A | 750/730 | 1.03 | 78 | 5 | 5 |
| | 3 Wks, R.T. | | | | | | | 5 |
| | 2 Mos, R.T. | | | | | | | 4 |

*Pounds per hundred gallons, solid basis.

TABLE 2

| Example No. | Antisettling Composition (Paint Age) | Loading* (phg) | FOG | Brookfield visc. (CP) 10 rpm/100 rpm | T.I. | Stormer Visc. (KU) | Sag (Mils) | Pigment Settling |
|---|---|---|---|---|---|---|---|---|
| Ex. 9 | Ex. 4 | 5.0 | | | | | | |
| | 1 Day, R.T. | | 5A | 416/442 | 0.94 | 72 | 4.6 | 7 |
| | 3 Wks, R.T. | | 5B | 264/278 | 0.95 | 65 | 4.4 | 7 |
| | 6 Wks, R.T. | | 5B | 272/294 | 0.93 | 65 | 3.4 | 6 |
| Ex. 10 | Ex. 5 | 5.0 | | | | | | |
| | 1 Day, R.T. | | 5.5A | 488/520 | 0.94 | 72 | 7.8 | 6 |
| | 6 Wks, R.T. | | 6.0A | 580/583 | 0.99 | 73 | 7.6 | 5 |
| Ex. 11 | Ex. 6 | 5.0 | | | | | | |
| | 1 Day, R.T. | | 5A | 380/405 | 0.94 | 73 | 4.4 | 7 |
| | 3 Wks, R.T. | | 5B | 240/256 | 0.94 | 65 | 4.4 | 7 |
| | 6 Wks, R.T. | | 5B | 248/258 | 0.96 | 64 | 4.2 | 6 |
| Comp. Ex. B | M-P-A 1075 | 5.0 | | | | | | |
| | 1 Day, R.T. | | 5B | 440/472 | 0.93 | 72 | 4.6 | 3 |
| | 3 Wks, R.T. | | 5B | 296/310 | 0.95 | 66 | 5.0 | 2 |
| | 6 Wks, R.T. | | 5B | 300/314 | 0.96 | 66 | 4.7 | 2 |
| Comp. Ex. C | No Additive | — | | | | | | |
| | 1 Day, R.T. | | 5A | 360/392 | 0.92 | 69 | 4.6 | 0 |
| | 3 Wks, R.T. | | 5B | 240/260 | 0.92 | 64 | 3.6 | 0 |
| | 6 Wks, R.T. | | 5B | 248/260 | 0.95 | 64 | 4.2 | 0 |

*Pounds per hundred gallons, solids basis.

TABLE 3

| Example No. | Antisettling Composition (Paint Age) | Loading* (phg) | FOG | Brookfield visc. (CP) 10 rpm/100 rpm | T.I. | Stormer Visc. (KU) | Sag (Mils) | Pigment Settling |
|---|---|---|---|---|---|---|---|---|
| Ex. 12 | Ex. 5 | 9.0 | | | | | | |
| | 1 Day, R.T. | | 4B | 730/635 | 1.15 | 75 | 5 | — |
| | 2 Wks, R.T. | | | | | | | 6 |
| | 1 Mo, R.T. | | | | | | | 3 |
| Ex. 13 | Ex. 7 | 9.0 | | | | | | |
| | 1 Day, R.T. | | 4A | 2550/1010 | 2.52 | 81 | 6 | — |

TABLE 3-continued

| Example No. | Antisettling Composition | (Paint Age) | Loading* (phg) | FOG | Brookfield visc. (CP) 10 rpm/100 rpm | T.I. | Stormer Visc. (KU) | Sag (Mils) | Pigment Settling |
|---|---|---|---|---|---|---|---|---|---|
| | | 2 Wks, R.T. | | | | | | | 8 |
| | | 1 Mo, R.T. | | | | | | | 7 |
| Comp. Ex. D | M-P-A 1075 | | 9.0 | | | | | | |
| | | 1 Day, R.T. | | 4A | 1800/1200 | 1.50 | 87 | 6 | — |
| | | 2 Wks, R.T. | | | | | | | 6 |
| | | 1 Mo, R.T. | | | | | | | 2 |
| Comp. Ex. E | No Additive | | — | | | | | | |
| | | 1 Day, R.T. | | 3.5B | 850/740 | 1.15 | 79 | 4 | — |
| | | 2 Wks, R.T. | | | | | | | 4 |
| | | 1 Mo, R.T. | | | | | | | 0 |

*Pounds per hundred gallons, solids basis.

TABLE 4

| Example No. | Antisettling Composition | (Paint Age) | Loading* (phg) | FOG | Brookfield visc. (CP) 10 rpm/100 rpm | T.I. | Stormer Visc. (KU) | Sag (Mils) | Pigment Settling |
|---|---|---|---|---|---|---|---|---|---|
| Ex. 14 | Ex. 1 | | 10.0 | | | | | | |
| | | 1 Wk, R.T. | | 5.5A | 600/310 | 1.94 | 66 | 5 | 9 |
| | | 1 Mo, R.T. | | | | | | | 8 |
| | | 1 Wk, 120° F. | | | | | | | 8 |
| | | 1 Mo, 120° F. | | | | | | | 7 |
| Ex. 15 | Ex. 2 | | 10.0 | | | | | | |
| | | 1 Wk, R.T. | | 5A | 360/260 | 1.38 | 65 | 4 | 9 |
| | | 1 Mo, R.T. | | | | | | | 9 |
| | | 1 Wk, 120° F. | | | | | | | 8 |
| | | 1 Mo, 120° F. | | | | | | | 8 |
| Ex. 16 | Ex. 3 | | 10.0 | | | | | | |
| | | 1 Wk, R.T. | | 6A | 520/289 | 1.80 | 66 | 5.5 | 9 |
| | | 1 Mo, R.T. | | | | | | | 8 |
| | | 1 Wk, 120° F. | | | | | | | 9 |
| | | 1 Mo, 120° F. | | | | | | | 8 |
| Comp. Ex. F | M-P-A 1075 | | 10.0 | | | | | | |
| | | 1 Wk, R.T. | | 5A | 168/212 | 0.79 | 65 | 3 | 4 |
| | | 2 Wks, R.T. | | | | | | | 2 |
| | | 1 Wk, 120° F. | | | | | | | 4 |
| | | 2 Wks, 120° F. | | | | | | | 2 |
| Comp. Ex. G | No Additive | | — | | | | | | |
| | | 1 Wk, R.T. | | 6A | 100/160 | 0.63 | 62 | 2.5 | 4 |
| | | 1 Mo, R.T. | | | | | | | 0 |
| | | 1 Wk, 120° F. | | | | | | | 2 |
| | | 1 Mo, 120° F. | | | | | | | 0 |

*Pounds per hundred gallons, solids basis.

TABLE 5

| Example No. | Antisettling Composition | (Paint Age) | Loading* (phg) | FOG | Brookfield visc. (CP) 10 rpm/100 rpm | T.I. | Stormer Visc. (KU) | Sag (Mils) | Pigment Settling |
|---|---|---|---|---|---|---|---|---|---|
| Ex. 17 | Ex. 5 | | 9.4 | | | | | | |
| | | 1 Wk, R.T. | | 5.5A | 400/270 | 1.48 | 66 | 6 | 8 |
| | | 2 Wks, R.T. | | | | | | | 8 |
| | | 1 Mo, R.T. | | 5.5A | 400/305 | 1.31 | 66 | 6 | 8 |
| Ex. 18 | Ex. 7 | | 9.4 | | | | | | |
| | | 1 Wk, R.T. | | 5.5A | 800/450 | 1.78 | 70 | 7 | 9 |
| | | 2 Wks, R.T. | | | | | | | 9 |
| | | 1 Mo, R.T. | | 4.0A | 750/480 | 1.56 | 71 | 7 | 9 |
| Comp. Ex. H | M-P-A 1075 | | 9.4 | | | | | | |
| | | 1 Wk, R.T. | | 2.0A | 350/325 | 1.08 | 67 | 6 | 2 |
| | | 2 Wks, R.T. | | | | | | | 0 |
| | | 1 Mo, R.T. | | | | | | | 0 |
| Comp. Ex. I | No Additive | | — | | | | | | |
| | | 1 Wk, R.T. | | 5.5A | 300/295 | 1.02 | 66 | 6 | 2 |
| | | 2 Wks, R.T. | | | | | | | 0 |
| | | 1 Mo, R.T. | | | | | | | 0 |

*Pounds per hundred gallons, solids basis.

TABLE 6

| Example Number | Antisettling Composition | Paint Age | Pigment Settling |
|---|---|---|---|
| Ex. 17 | Ex. 5 | 1 Wk, 120° F. | 7 |
| | | 2 Wks, 120° F. | 6 |
| | | 1 Mon, 120° F. | 4 |
| Ex. 18 | Ex. 7 | 1 Wk, 120° F. | 8 |
| | | 2 Wks, 120° F. | 7 |
| | | 1 Mon, 120° F. | 5 |
| Comp. Ex. H | M-P-A 1075 | 1 Wk, 120° F. | 4 |
| | | 2 Wks, 120° F. | 0 |

TABLE 6-continued

| Example Number | Antisettling Composition | Paint Age | Pigment Settling |
|---|---|---|---|
| | | 1 Mon, 120° F. | 0 |
| Comp. Ex. I | No Additive | 1 Wk, 120° F. | 2 |
| | | 2 Wks, 120° F. | 0 |
| | | 1 Mon, 120° F. | 0 |

TABLE 7

| Example Number | Antisettling Composition | Paint Age | Pigment Settling |
|---|---|---|---|
| Ex. 19 | Ex. 1 | 1 Day, R.T. | 9 |
| | | 1 Wk, R. T. | 8 |
| | | 2 Wks, R.T. | 8 |
| | | 1 Mon, R.T. | 5 |
| Comp. Ex. J | No Additive | 1 Day, R.T. | 6 |
| | | 1 Wk, R. T. | 4 |
| | | 2 Wks, R.T. | 3 |
| | | 1 Mon, R.T. | 1 |

Although the invention has been described and illustrated in detail, it is to be clearly understood that the same is by way of illustration and example, and is not to be taken by way of limitation. For example, it is contemplated that a 100% solids amine neutralized ethylene-acrylic acid copolymer can be utilized as an antisettling additive in paint manufacture. The spirit and scope of the present invention are to be limited only by the terms of the appended claims.

We claim:

1. A method of inhibiting settling of solid particles in an aqueous paint composition, wherein said aqueous paint composition comprises a resin binder, particles selected from the group consisting of pigments, fillers and reflecting agents, and water or a water-miscible solvent, said method comprising incorporating in said coating composition from about 1 to about 30 pounds per hundred gallons of aqueous paint composition of an additive comprising at least one emulsifiable copolymer of an α-olefin and an α- β-ethylenically unsaturated carboxylic acid at least partially neutralized with a neutralizing agent selected from the group consisting of group 1A metal hydroxides, oxides and carbonates, ammonia and organic amines.

2. A method according to claim 1, wherein from about 1 to about 10 pounds per hundred gallons of said additive is incorporated in said aqueous paint composition.

3. A method according to claim 1, wherein said aqueous paint composition is selected from the group consisting of acrylic latex paints, vinyl acrylic latex paints, and water-reducible alkyd resin paints.

4. A method according to claim 1, wherein the neutralizing agent is an amine.

5. A method according to claim 1, wherein said at least one emulsifiable low molecular weight copolymer of an α-olefin and an α,β-ethylenically unsaturated carboxylic acid is present in an amount of from about 3 to about 70 weight percent of the total additive.

6. A method according to claim 5, wherein the α,β-ethylenically unsaturated carboxylic acid has 3 to 8 carbon atoms.

7. A method according to claim 5, wherein said at least one emulsifiable copolymer of an α-olefin and an α,β-ethylenically unsaturated carboxylic acid has a molecular weight in the range from about 500 to about 20,000.

8. A method according to claim 5, wherein the α-olefin is ethylene with a concentration in the copolymer acid of at least 50 mole percent.

9. A method according to claim 8, wherein the α,β-ethylenically unsaturated carboxylic acid is an α,β-ethylenically unsaturated monocarboxylic acid having 3 to 6 carbon atoms.

10. A method according to claim 9, wherein the emulsifiable copolymer acid has a density of about 0.92 to about 0.98 g/cc, a softening point of from about 70° C. to about 120° C., and an acid value in the range from about 20 to 300.

11. A method according to claim 5, wherein the neutralizing agent is present in an amount sufficient to neutralize 25 to 200% of the acid groups in said at least one emulsifiable low molecular weight copolymer of an α-olefin and an α,β-ethylenically unsaturated carboxylic acid, and the neutralization is effected in a solvent selected from the group consisting of water, water-miscible solvents selected from the group consisting of methanol, ethanol, isopropanol, propanol, butanol, sec-butanol, cyclohexanol, glycol ether, glycol ether acetates, and mixtures thereof.

12. A method according to claim 11 wherein said at least one emulsifiable low molecular weight copolymer acid is neutralized in water.

13. A method according to claim 5 wherein the neutralizing agent is present in an amount sufficient to completely neutralize all of the acid groups in said emulsifiable low molecular weight copolymer acid in water.

* * * * *